United States Patent
Li et al.

(10) Patent No.: US 12,094,452 B2
(45) Date of Patent: Sep. 17, 2024

(54) SYSTEMS AND METHODS FOR TRAINING VOICE QUERY MODELS

(71) Applicant: Comcast Cable Communications, LLC, Philadelphia, PA (US)

(72) Inventors: Wenyan Li, Arlington, VA (US); Ferhan Ture, Washington, DC (US); Jose Casillas, Spotsylvania, VA (US); George Thomas Des Jardins, Alexandria, VA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 124 days.

(21) Appl. No.: 17/383,236

(22) Filed: Jul. 22, 2021

(65) Prior Publication Data

US 2022/0028373 A1    Jan. 27, 2022

Related U.S. Application Data

(60) Provisional application No. 63/056,361, filed on Jul. 24, 2020.

(51) Int. Cl.
*G10L 15/06* (2013.01)
*G06F 40/169* (2020.01)
(Continued)

(52) U.S. Cl.
CPC .......... *G10L 15/063* (2013.01); *G06F 40/169* (2020.01); *G06N 20/00* (2019.01);
(Continued)

(58) Field of Classification Search
CPC ....... G10L 15/063; G10L 15/22; G10L 15/19; G10L 26/63; G06F 40/169; G60N 20/00
See application file for complete search history.

(56) References Cited

U.S. PATENT DOCUMENTS 10,832,679 B2 * 11/2020 Szymanski ............. G06N 3/08
11,210,059 B2 * 12/2021 Trim ...................... G06F 3/167
(Continued)

FOREIGN PATENT DOCUMENTS

CN       106020488 A  * 10/2016  ............ G06F 3/011
CN       109671434 A  *  4/2019  ............ G10L 15/22
(Continued)

OTHER PUBLICATIONS

Li Wenyan Wenyan Li@Comcast Com et al: "Auto-annotation-for Voice-enabled Entertainment Systems," Extended Abstracts of the 2021 Chi Conference on Human Factors in Computing Systems, ACMPUB27, New York, NY, USA, Jul. 25, 2020, pp. 1557-1560.

*Primary Examiner* — Mohammad K Islam
(74) *Attorney, Agent, or Firm* — BakerHostetler

(57) ABSTRACT

Methods for automatically evaluating ASR outputs and providing annotations, including corrections, on the transcriptions—in order to improve recognition—may be based on an analysis of sessions of user voice queries, utilizing time-ordered ASR transcriptions of user voice queries (i.e., user utterances). This utterance-based approach may involve extracting both session-level and query-level characteristics from a voice query sessions and identifying patterns of query reformulation in order to detect erroneous transcriptions and automatically determine an appropriate correction. Alternative, or in addition, ASR outputs may be evaluated based on user behavior. The outcomes may be classified as positive or negative. An ASR transcription may be labeled using the description of the outcome. The labeled transcription may be used as training data to train a model to output improved transcriptions of voice queries.

19 Claims, 9 Drawing Sheets

(51) Int. Cl.
  *G06N 20/00* (2019.01)
  *G10L 15/19* (2013.01)
  *G10L 15/22* (2006.01)
  *G10L 25/63* (2013.01)
(52) U.S. Cl.
  CPC .............. *G10L 15/19* (2013.01); *G10L 15/22* (2013.01); *G10L 25/63* (2013.01)

(56) References Cited

U.S. PATENT DOCUMENTS

| | | | |
|---|---|---|---|
| 11,562,735 B1* | 1/2023 | Gupta | G10L 15/197 |
| 2015/0199965 A1* | 7/2015 | Leak | G10L 15/22 |
| | | | 704/249 |
| 2019/0287519 A1 | 9/2019 | Ediz et al. | |
| 2019/0384811 A1* | 12/2019 | Sen | G06F 40/35 |
| 2020/0234700 A1* | 7/2020 | Heltewig | G06F 40/56 |

FOREIGN PATENT DOCUMENTS

| | | | | |
|---|---|---|---|---|
| CN | 110992932 A | * | 4/2020 | ............ G10L 15/02 |
| CN | 111933127 A | * | 11/2020 | ........... G10L 15/063 |
| CN | 112599124 A | * | 4/2021 | ............ G10L 15/22 |
| CN | 113271383 A | * | 8/2021 | ........... G10L 15/063 |
| CN | 113611305 A | * | 11/2021 | ............ G10L 15/22 |
| WO | WO-2021030918 A1 | * | 2/2021 | ........... G10L 15/063 |

\* cited by examiner

SYSTEMS AND METHODS FOR TRAINING VOICE QUERY MODELS

CROSS-REFERENCE TO RELATED APPLICATIONS

This application claims the benefit of priority of U.S. provisional patent application No. 63/056,361, filed Jul. 24, 2020, and titled "Systems and Methods for Training Voice Query Models," the content of which is hereby incorporated by reference in its entirety.

BACKGROUND

Automatic speech recognition (ASR) systems may be used to convert a user's speech into text, which may then be analyzed, using natural language processing for example, in order to try to understand the meaning of the user's speech. In ASR systems, training is generally accomplished manually (e.g., supervised, by human, etc.). Service providers may use ASR systems to enable subscribers to control their customer premises equipment, such as selecting particular content to watch, using voice commands or queries. However, content may be added and/or removed from a content distribution network associated with the service provider at a rate that makes manual training difficult, or even impossible, to maintain. What is needed is a method for obtaining training data continuously for ASR systems with little to no supervision.

SUMMARY

Methods and systems for improved training of an ASR system to recognize voice queries (e.g., translation, transcription, interpretation, etc.) are disclosed.

Automatically evaluating ASR transcriptions of voice queries and providing annotations, including corrections, for the transcriptions—in order to improve recognition—may be based on an analysis of sessions of user voice queries, utilizing time-ordered ASR transcriptions of user voice queries (i.e., user utterances). This utterance-based approach may comprise evaluating both session-level and query-level characteristics of a plurality of voice query sessions to identify erroneous transcriptions and identifying patterns of query reformulation in order to automatically determine an appropriate correction.

Alternatively, or in addition, improved transcription of voice queries may be achieved by grouping and/or labeling transcriptions of voice queries by an outcome of the transcription based on user behavior following a voice query. The outcomes may be classified as positive outcomes or negative outcomes. A positive outcome may be determined if a user does not issue follow-up queries and/or stays tuned to a channel, for example. A negative outcome may be determined if a user repeats the query, for example. A machine learning model may be trained using the transcriptions classified as having positive or negative outcomes. Automatically classifying transcriptions as positive or negative based on outcomes associated with user behavior provides a continuous set of training data to enhance the machine learning model of an ASR system. For example, transcriptions labeled as resulting in negative outcomes may be used to improve transcription of a particular voice query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
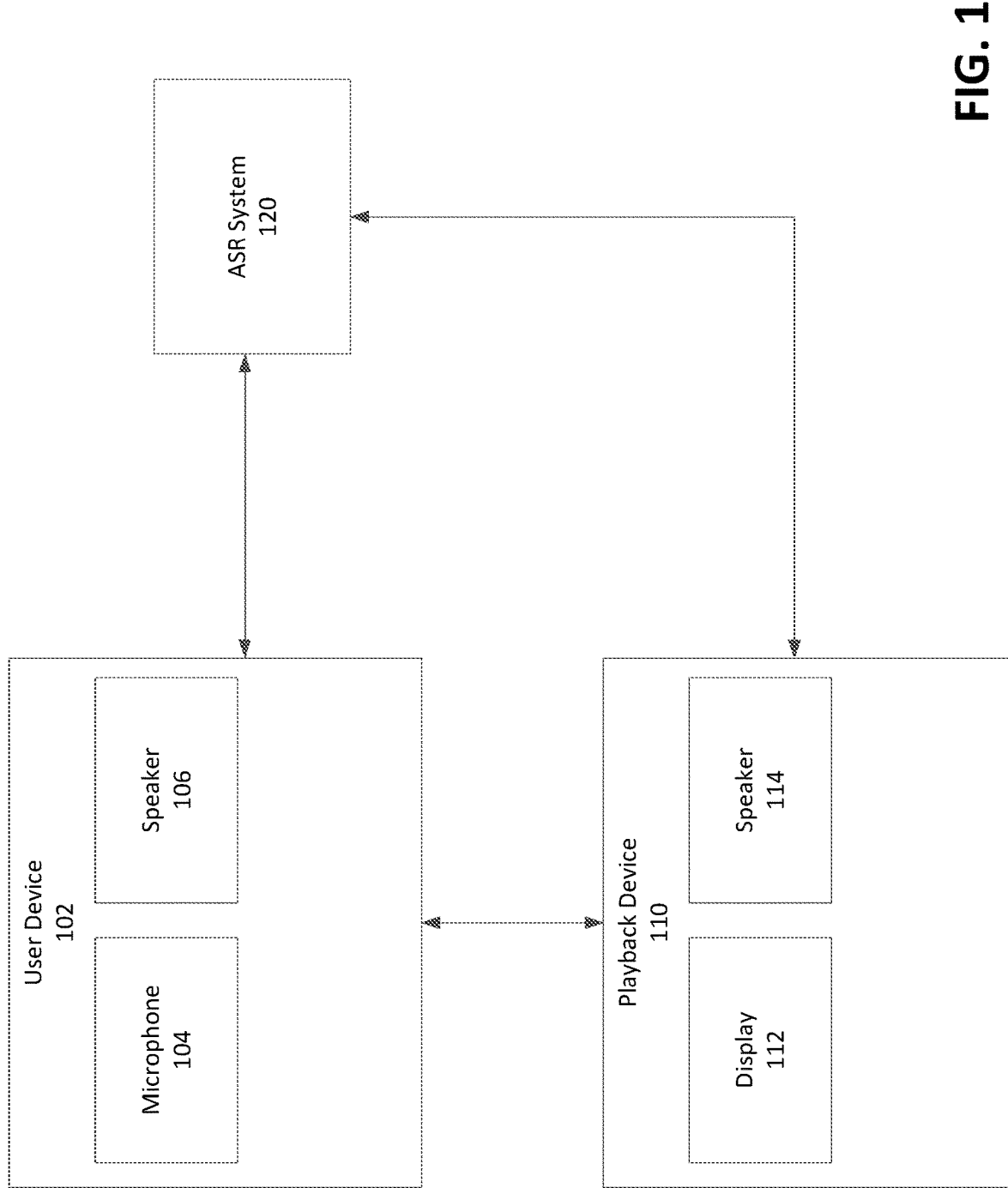
FIG. 1 shows an example system.

FIG. 1 shows a block diagram of an example system 100. The system 100 may comprise a user device 102, a playback device 110, and an automated speech recognition (ASR) system 120. The user device 102 may comprise a microphone 104. The user device may further comprise a speaker 106. The playback device 110 may be configured to output (e.g., playback) one or more content assets and may comprise a display 112 and a speaker 114. The ASR system 120 may be configured to process one or more voice queries by performing speech recognition processing.

The user device 102 may comprise a voice-activated remote control for the playback device 110. For example, the playback device may comprise a television control device, such as a set box or the like. Alternatively, the user device 102 may comprise a voice-controlled digital assistant, a voice-controlled Internet of Things (IoT) device, a voice-activated controller for a security system or other premises management system, a home automation device, or any other device capable of being controlled by a voice query uttered by a user of the user device. The user device 102 may comprise a mobile phone, a personal digital assistant, a desktop, laptop, or table computer, or any other form of user device configured to receive user input.

The user device 102 may be configured to receive a voice query from one or more users. A voice query may comprise a user utterance. The voice query may comprise audio signals or data representing the user utterance, such as audio data or signals captured or generated by an audio input component of the user device 102, such as, for example, the microphone 104. The user device 102 may comprise a hands-free device that is configured to be operated using one or more voice queries. The user device 102 may additionally or alternatively comprise one or more buttons or input icons and may receive input from one or more users operating the one or more buttons or input icons. The speaker 106 may be configured to output audio in response to receipt of the voice query. For example, a voice query may be received through the microphone 104 comprising an utterance, such as "tune to channel 11," "Treadstone," or "Star Wars". In the context of a security system, home automation system, or other premises management system, a voice query may comprise an utterance such as "arm the system," "disarm the system," or "unlock the door." In response to the voice query, the user device 102 may output, through the speaker 106, a response such as "the current temperature is seventy-six degrees" or "the system is now armed." At least a portion of the user device 102 may be implemented on a remote server. For example, all or a portion of the operations performed by the user device 102 may be implemented by a cloud server.

The playback device 110 may be configured to cause output (e.g., playback) of content to one or more users. The playback device 110 may receive one or more instructions from the user device 102, including but not limited to instructions to play, pause, stop, fast-forward, rewind, or record content. The playback device 110 and the user device 102 may be the same device. The display 112 of the device 110 may be configured to display or output content to the one or more audience members. The display 112 may be any device capable of displaying or outputting video or image content to an audience member, such as a tablet, a computer monitor, or a television screen. The display 112 may be part of the playback device 110 such as in the example that the playback device 110 is a tablet or a computer. The display 112 may be separate from the playback device 110 such as in an example that the playback device 110 is a television control device, such as a set top box, and the display 112 is a television screen in electrical communication with the television control device.

The speaker 114 may be configured to output audio associated with the content. The speaker 114 may be any device capable of outputting audio content. The speaker 114 may be part of the playback device 110 such as in the example that the device 112 is a tablet or a personal computer. The speaker 114 may be separate from the playback device 110 such as in an example that the playback device 110 is a television control device, such as a set top box, and the speaker 114 is a television or other external speaker in electrical communication with the television control device.

The ASR system 120 may be capable of performing speech recognition processing on one or more voice queries. The ASR system 120 may comprise, for example, one or more of a speech capture module, a digital signal processor (DSP) module, a pattern matching module, and/or a machine learning model. Speech recognition may be performed in a variety of ways and at different levels of complexity. The speech recognition processing performed by the ASR system 120 on a voice query received via the user device 102 may result in output of a transcription (e.g., translation, conversion) of the audio data representing the voice query into text, such as a string of text. The resulting text transcription may be provided to a natural language processing component (not shown) for analysis to determine the meaning of the voice query, i.e., the meaning of the user's utterance. Determination of the meaning of the voice query may be used to cause an action to be performed, such as causing the display of requested content or controlling a premises management system.

Figure 2:
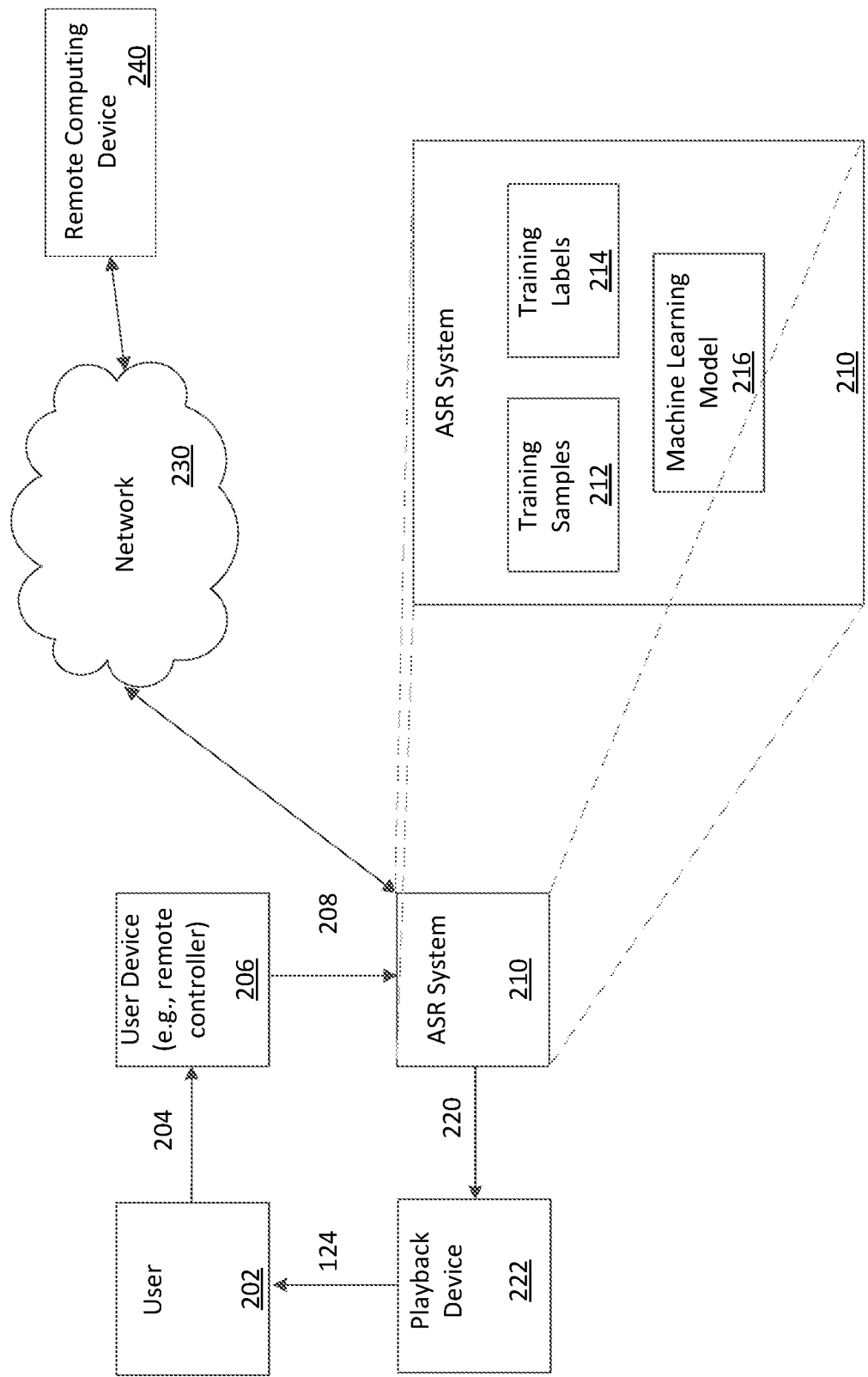
FIG. 2 shows an example operating environment.

FIG. 2 shows an example operating environment. The example operating environment may comprise a network 230 and a remote computing device 240. The network 230 may comprise a content distribution network associated with a service provider. The remote computing device 240 may comprise a server associated with the service provider.

The operating environment may further comprise a user device 206 (e.g., remote controller), an automated speech recognition (ASR) system 210, and a playback device 222, such as a set-top box, a television, a combination thereof, or any other device configured for output (e.g., playback) of content. The user device 206 and playback device 222 may be located at a premises, such as a residence of a user 202. The user 202 may be or be associated with a subscriber to the service provider. The user device 202 may be similar to the user device 102 of FIG. 1. The playback device 222 may be similar to the playback device 110 of FIG. 1. The ASR system 210 may be similar to the ASR system 120 in FIG. 1.

The ASR system 210 may be located at the premises 200, such as integrated into the playback device 110 or the user device 102. The ASR system 210 may be located on the network 230, such as implemented on the remote computing device 240 or another computing device or server on the network. The ASR system 210 may be a cloud-based system. The user device 206 may be used to control the playback device 222. The ASR system 210 may cause the playback device 222 to be controlled, for example in response to voice queries received from the user 202 via the user device 206. Functions related to control of the playback device 222, such as channel tuning, content selection, or application launching, may be performed by the ASR system 210, the playback device 222, or by another device, which may be integrated with the ASR system 210 and/or the playback device 222. The ASR system 210 may communicate with the remote computing device 240 via the network 230 and vice versa.

The user 202 may enter input 204 into the user device 206. The input 204 may comprise one or more voice queries, one or more button presses, or the like, and/or any combination of the foregoing. The user device 206 may transmit one or more signals or data 208 to the ASR system 210. The one or more signals or data 208 may be indicative of the one or more voice queries, the one or more button presses, the like, and/or any combination of the foregoing. For example, the one or more voice queries may comprise audio signals or data representing a voice utterance of the user 202, such as audio data or signals captured or generated by an audio input component of the user device 206, such as, for example, a microphone (e.g., microphone 104).

The ASR system 210 may comprise a machine learning model 216 for transcribing (i.e., translating) speech (e.g., a voice query) to text. For example, the machine learning model may comprise a Deep Neural Network (DNN), a traditional machine learning model, such as Random Forest, Logistic Regression, Naïve Bayes, or any other suitable machine learning model. The ASR system 210 may comprise training samples 212 and training labels (i.e., annotations) 214 to train the machine learning model 216. The machine learning model 216 may use the training samples 212 and the training labels 214 to train the model to determine a particular transcription for a particular incoming voice query. The training samples 212 may comprise one or more signals or data indicative of voice queries, such as a digitized speech signal, waveform file, audio file, or the like. The training labels 214 may comprise annotations associated with the transcriptions or associated with outcomes of transcriptions of the training samples 212, such as the translated text of a voice query, and/or other labels such as negative/positive, good/bad, etc. One of the training labels 214 may be associated with one or more training samples 212. One of the training samples 212 may be associated with one or more training labels 214. The training samples 212 and the training labels 214 may be associated in a one-to-one manner. The ASR system 210 may be preloaded with some or all of the training samples 212 and/or the training labels 214. The ASR system 210 may receive some or all of the training samples 212 and/or the training labels 214 from the remote computing device 240 via the network 230. At least a portion of the training labels 214 may initially be associated with at least a portion of the training samples 212 by supervised training. The ASR system 210 may use the training samples to train the model 216 to transcribe voice queries to text. The ASR system 210 may determine a transcription of a voice query using the trained model.

Even with the use of a large set of training data (e.g., training samples 212 and corresponding training labels 214), the ASR system 210 may output an erroneous transcription of a voice query from time-to-time. For example, a user may speak a voice query requesting that a particular item of content, such as the popular television show "Treadstone" be output on the user's playback device. In response to the voice query "Treadstone," the ASR system 210 may erroneously output the transcription "Tradestone." In order to avoid such speech recognition errors and improve the overall user experience, it is desirable to continuously update the ASR system 210 with new high quality annotated (i.e., labeled) training samples. This process may be, and often is, performed in a supervised manner (e.g., manually) and involves listening to the actual voice queries, reviewing the transcriptions output by the ASR system for those queries, and then annotating the results to identifying the positive (i.e., correct) outcomes, as well as identifying the erroneous ones and providing corrections. The annotated voice queries may then be fed back to the machine learning model of the ASR system 210 as additional training samples/labels in order to improve the accuracy of recognition. However, producing new training samples using such a supervised or manual approach can be tedious and may be infeasible for large scale systems, such as a voice-activated entertainment system provided by a service provider, such as a cable television service provider or the like. Described herein are methods for improved updating and training of an ASR system based on automated annotation of voice queries for use in such training.

Methods for evaluating ASR outputs and providing annotations, including corrections, on the transcriptions may be based on an analysis of sessions of user voice queries, utilizing time-ordered ASR transcriptions of user voice queries (i.e., user utterances). This utterance-based approach may comprise evaluating both session-level and query-level characteristics of a plurality of voice query sessions and identifying patterns of query reformulation in order to detect erroneous transcriptions and automatically determine an appropriate correction.

Voice queries may be received from many user devices of users of a system, such as a voice-activated entertainment system. Such systems may have potentially millions of users and user devices. As used herein, a voice query session may comprise a plurality of time-ordered voice queries received from a same one of the many user devices of a system (e.g., user device 206 in FIG. 2), where a time between consecutive queries received from the user device satisfies (e.g., does not exceed) a threshold value. For example, a voice query session may comprise a plurality of time-ordered voice queries received from a user device, where the time between consecutive queries does not exceed a threshold of 45 seconds. The 45 second threshold is just one example, and the threshold may be lesser or greater than 45 seconds. For example, the threshold may be 15, 30, or 60 seconds. The voice query session may also comprise the corresponding ASR transcription of each voice query of the session. One voice query session may comprise a plurality of voice queries received from a user device during a first time period, and another voice query session may comprise another plurality of voice queries received from that same user device during a different time period. Another voice query session may comprise a plurality of voice queries received from a different user device. Thus, in the case of a system having a large number (e.g., potentially millions) of users and user devices, a large number of voice query sessions may be determined.

The rate of ASR transcription errors during a voice query session may positively correlate to session length, and users may have a high probability of repeating voice queries when facing such transcription errors. Detection of such ASR transcription errors may therefore be based on both session-level and query-level characteristics of one or more voice query sessions.

On the session-level, a voice query session may be likely to have erroneous transcriptions if it contains multiple transcriptions with the same content, for example, where a user is trying to correct the automatic transcription by repeating the voice query by trying to speak more clearly or slowly to get the correct result. On the query-level, a transcription may be suspected to be erroneous when the query (i) is often repeated by users in respective sessions, and (ii) has a short time interval from the previous one before it is repeated. A particular voice query may be considered important when it appears in many voice query sessions. Automatic detection of erroneous voice query transcriptions may be based on an analysis of one or more of these session-level and/or query-level characteristics.

In a set of sessions that contain repeated queries (denoted $S_{rep}$), a transcription of voice query q within the set of sessions may be determined to be erroneous based on one or more of the following characteristics:

$s(q)$—a quantity of sessions that contain the voice query q;

$L_{rep}(q)$—a probability (e.g., likelihood) of voice query q to be repeated; and $t_m(q)$—a median time interval between repeated instances of voice query q in the set of sessions.

As one example, the probability (e.g., likelihood) of voice query q being repeated, i.e., $L_{rep}(q)$, may be determined by dividing the quantity of sessions containing a repeated transcription of voice query q, i.e., $S_{rep}$, by the quantity of all sessions containing a transcription of the voice query q, i.e., $s(q)$. That is, $L_{rep}(q)$ may equal $S_{rep}/s(q)$. In other examples, the probability of voice query q being repeated may be determined in a different way.

The transcription of voice query q may be determined to be erroneous based on one or more of these characteristics—i.e., $s(q)$, $L_{rep}(q)$, $t_m(q)$—satisfying a respective threshold value. For example, the voice query transcription may be determined to be erroneous if $s(q) > T_s$, where $T_s$ represents a threshold quantity of sessions containing the voice query q. The voice query transcription may be determined to be erroneous if $L_{rep}(q) > T_{rep}$, where $T_{rep}$ is a value (for example, between 0 and 1) indicative of a probability of a voice query being repeated by a user. The voice query transcription may be determined to be erroneous if $t_m(q) < T_t$, where $T_t$ represents a threshold median amount of time between consecutive repetitions of a voice query by a user. Although each of these session-level and query-level characteristics may individually be indicative of an erroneous transcription, a particular transcription of a voice query q may be determined to be erroneous only when a plurality of these characteristics satisfies its respective threshold. A particular transcription of a voice query q may be determined to be erroneous only when all of these characteristics satisfies its respective threshold.

As one example, an erroneous transcription of a voice query q, denoted $Err(q)$, may be determined in accordance with the following equation:

$$Err(q) = \begin{cases} 1, & \text{if } s(q) > T_s, L_{rep}(q) > T_{rep}, t_m(q) < T_t, \\ & \text{s.t. } q \in S_{rep} \\ 0, & \text{otherwise} \end{cases}$$

where Err(q)=1 indicates a determination that the transcription of voice query q is erroneous. In this example, all three threshold values must be satisfied in order to find the voice query transcription to be erroneous.

Empirically, the goal is to find erroneous transcriptions that are common among sessions and are problematic to users such that they repeat them hastily and frequently. The threshold values $T_s$, $T_{rep}$, and $T_t$ may be set based on such a goal. For example, the following threshold values may be employed: $T_s$=300, $T_{rep}$=0.2, and $T_t$=13. Thus, in this example, a transcription of a voice query q in the set of voice query sessions $S_{rep}$ will be determined to be erroneous if it appears in over 300 voice query sessions, has more than 20% chance of being repeated by a user, and where the median time between consecutive repetitions is less than 13 seconds. It is understood that the values for $T_s$, $T_{rep}$, and $T_t$ may be set differently and that the values of 300, 0.2, and 13 are merely one example.

Once an erroneous transcription, Err(q), of a voice query q has been determined, a correction of the erroneous transcription may be determined. A method of automatically determining a correction for an erroneous transcription, Err(q), may comprise analyzing one or more query reformulation patterns in one or more of the voice query sessions containing the erroneous transcription.

The term query reformulation pattern may refer to a pattern of voice queries in a voice query session that are indicative of a user trying to reformulate a voice query in order to have the ASR system output a correct transcription. A query reformulation pattern that may be useful in determining a correction for an erroneous transcription may be identified in voice query sessions that contain multiple voice queries which did not result in exact repeats in transcription. For example, in sessions that contain multiple queries which did not result in exact repeats in transcription, users may have been trying to reformulate the query with variations in speech rate, pronunciations, etc., in order to try to "help" the ASR system output the correct transcription. However, for each variation of the voice query uttered by the user, the ASR system may yield different transcriptions. When such a query reformulation pattern is detected, it may be inferred that the last query in the session is most likely the correct one. That is, the last query in the session may be considered likely to be a corrected transcription of a previous query.

For each detected erroneous transcription, Err(q), a possible correction may be inferred by selecting voice query sessions {$s_1, s_2, \ldots, s_n$}, where each session $s_i$=($q_1, q_2, \ldots, q_{ti}$) contains $t_i$ time ordered user voice queries and meets one or more of the following conditions (i.e., exhibits the following query reformulation pattern):

(1) the session contains more than one voice query and does not contain repeated transcriptions;
(2) the median time interval between voice queries is less than a threshold $T_t$;
(3) the next-to-last voice query transcription is determined to have been erroneous; for example, Err($q_{ti-1}$)=1.

In one example, each selected voice query session {$s_1, s_2, \ldots, s_n$} is selected based on the session meeting each of these three conditions. In other examples, the subset of voice query sessions may be selected based on sessions that meet one or more of these conditions. The subset of voice query sessions may be selected based on sessions that meet other conditions indicative of a query reformulation attempt by a user.

From each session $s_i$, the transcriptions of the last two voice queries of the session, $q_{ti-1}$ and $q_{ti}$, may be extracted. The transcription of the last voice query $q_{ti}$ may be considered a correction candidate for the erroneous transcription, Err($q_{ti-1}$), of the next-to-last voice query $q_{ti-1}$. The extracted ($q_{ti-1}$, $q_{ti}$) pairs may be grouped by the erroneous transcription, Err($q_{ti-1}$), thereby collecting possible correction candidates among all of the selected sessions.

For a specific erroneous transcription of a voice query $q_{ti-1}$, which may now be denoted $q_{err}$, a confidence may be calculated for each associated unique correction candidate, denoted $q'_i$, and a most confident candidate may be selected as a correction. As one example, the confidence value may be determined by dividing the number of times $q'_i$ appears as the correction candidate for $q_{err}$ (e.g., count ($q'_i$, $q_{err}$) divided by the total number of all extracted $q_{ti-1}$, $q_{ti}$) pairs for $q_{err}$ (e.g., count ($q_{err}$)). That is, the probability P($q'_i$|$q_{err}$) that a particular correction candidate $q'_i$ is the correct transcription of $q_{err}$ may be expressed as follows:

$$P(q'i \mid qerr) = \frac{\text{count}(q'i, qerr)}{\text{count}(qerr)}$$

While in a single session, it is possible for the transcription of voice query $q_{ti}$ to be a wrong correction for voice query $q_{ti-1}$, as sessions are aggregated, the best correction candidate may have a much higher confidence than the rest of the correction candidates. Thus, the correction candidate $q'_i$ with a highest determined confidence value P may be determined (i.e., selected) as a correction of the erroneous transcription, Err($q_{ti-1}$). Note that in other examples, the confidence value for a correction candidate $q'_i$ may be determined in a different way.

Figure 3:
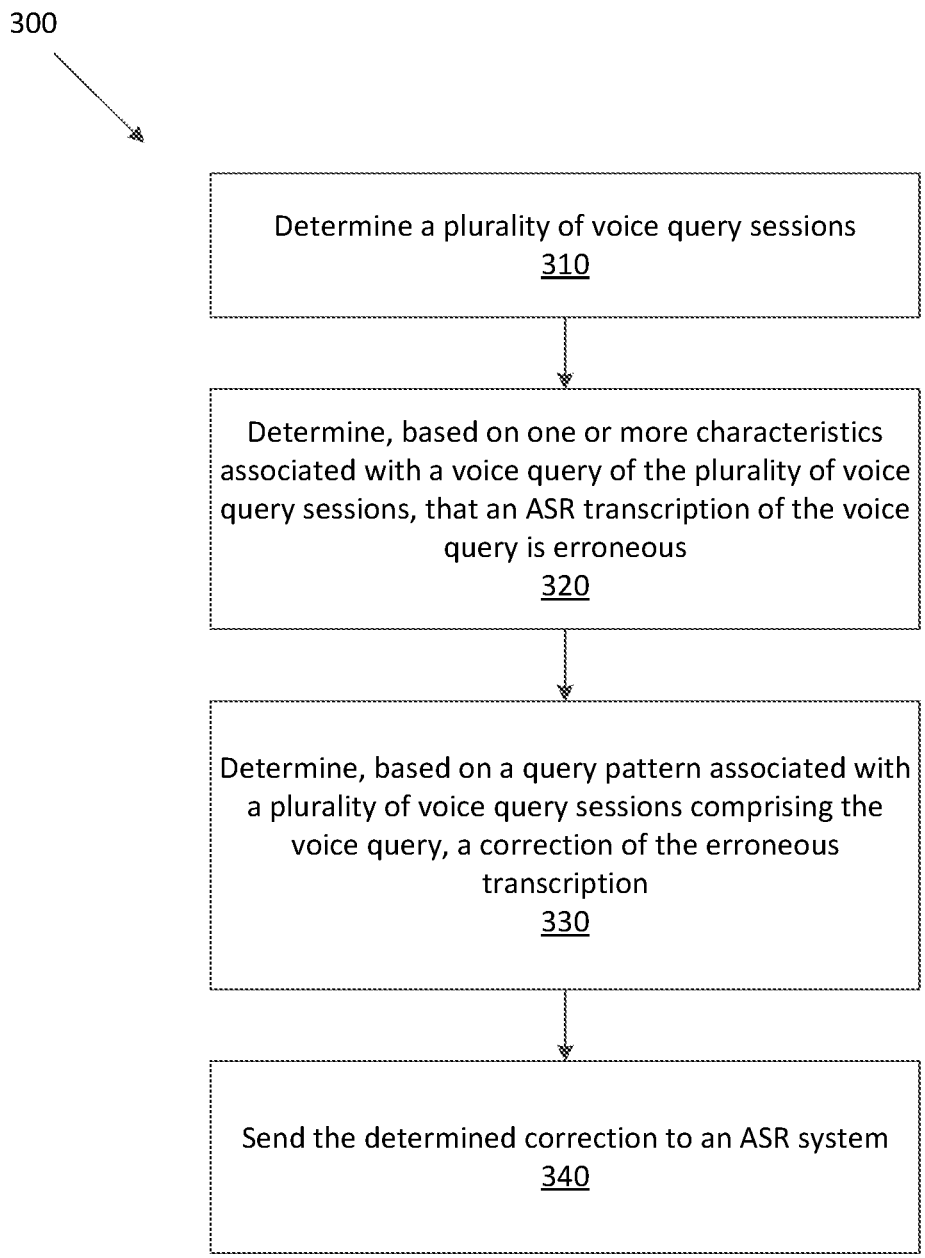
FIG. 3 shows an example method.

FIG. 3 shows an example method that may be employed in connection with the example environment illustrated in FIG. 2. In step 310, a plurality of voice query sessions may be determined. Each voice query session may comprise a plurality of voice queries and, for each of the plurality of voice queries, an automated speech recognition (ASR) transcription of the voice query. Each voice query session may comprise a time-ordered sequence of voice queries received from a same user device (e.g., user device 206 in FIG. 2), where the time between consecutive voice queries of the voice query session satisfies (e.g., does not exceed) a threshold value. For example, a voice query session may comprise a plurality of time-ordered voice queries received from a same device, where the time between consecutive queries does not exceed a threshold of 45 seconds. The 45 second threshold is just one example, and the threshold may be lesser or greater than 45 seconds. For example, the threshold may be 15, 30, or 60 seconds. One voice query session may comprise a plurality of voice queries received from a user device during a first time period, and another voice query session may comprise another plurality of voice queries received from that same user device during a different time period. Another voice query session may comprise a plurality of voice queries from a different user device. Thus, in the case of a large entertainment system having a large number of users and user devices, a large number of voice query sessions may be determined.

In step 320, the ASR transcription of a voice query of the plurality of voice query sessions may be determined to be erroneous. The ASR transcription of the voice query may be determined to be erroneous based on one or more session-level and/or query-level characteristics associated with the voice query. The ASR transcription of the voice query may be determined to be erroneous based on the one or more characteristics satisfying respective thresholds. The one or more characteristics may comprise: a quantity of voice query sessions that contain the voice query; a probability or likelihood of the voice query being repeated; and an amount of time between consecutive repetitions of the voice query. The transcription of the voice query may be determined to be erroneous based on any one of these characteristics satisfying a respective threshold. The transcription of the voice query may be determined to be erroneous based on all of these characteristics satisfying its respective threshold.

As an example, the transcription of the voice query may be determined to be erroneous if: (i) a quantity of voice query sessions that contain the voice query satisfies (e.g., exceeds) a threshold value $T_s$, (ii) a value (e.g., between 0 and 1) representing a probability of the voice query being repeated satisfies (e.g., exceeds) a threshold value $T_{rep}$, and (iii) an amount of time between consecutive repetitions of the voice query satisfies (e.g., does not exceed) a threshold amount of time $T_t$. As just one example, $T_s$ may equal 300, $T_{rep}$ may equal 0.2, and $T_t$ may equal 13 seconds. Thus, in this example, a transcription of a voice query of the plurality of voice query sessions may be determined to be erroneous if it appears in over 300 voice query sessions, has more than a 20% chance of being repeated by a user, and where the median time between consecutive repetitions is not greater than 13 seconds. It is understood that the values for $T_s$, $T_{rep}$, and $T_t$ may be set differently and that the values of 300, 0.2, and 13 are merely one example.

In step 330, a correction of the erroneous transcription may be determined. The correction of the erroneous transcription may be determined based on one or more query patterns associated with a plurality of voice query sessions containing the erroneous transcription of the voice query. The one or more query patterns may comprise a query reformulation pattern.

Determining a correction for the erroneous transcription based on a query reformulation pattern may comprise first determining a subset of the plurality of voice query sessions, wherein each voice query session of the determined subset satisfies one or more conditions. The one or more conditions may comprise: (i) the voice query session containing more than one voice query but not containing repeated (i.e., duplicated) transcriptions, (ii) the voice query session having a median time interval between voice queries that does not exceed a threshold amount of time, and (iii) the erroneous transcription is the transcription of the next-to-last voice query of the session.

For the subset of voice query sessions that satisfy these conditions, step 330 may further comprise selecting, from each voice query session of the determined subset, the transcription of the last query of the voice query session and defining the transcription of that last query of the session as a candidate correction for the erroneous transcription. Step 330 may further comprise selecting, based on a confidence associated with each candidate correction, one of the candidate corrections as the correction of the erroneous transcription.

In step 340, the erroneous transcription and its associated voice query data or signal may be annotated with the selected correction. The annotated voice query may be sent to the ASR system performing speech recognition processing on user voice queries. The annotated voice query may be used as an additional labeled training sample for a machine learning model utilized by the ASR system. The selected correction of the voice query transcription may be utilized by the ASR system as a synonym for the voice query. Use of the annotated voice query for these purposes may improve the accuracy of speech recognition processing by the ASR system and help to reduce the number of erroneous transcriptions.

Figure 4:
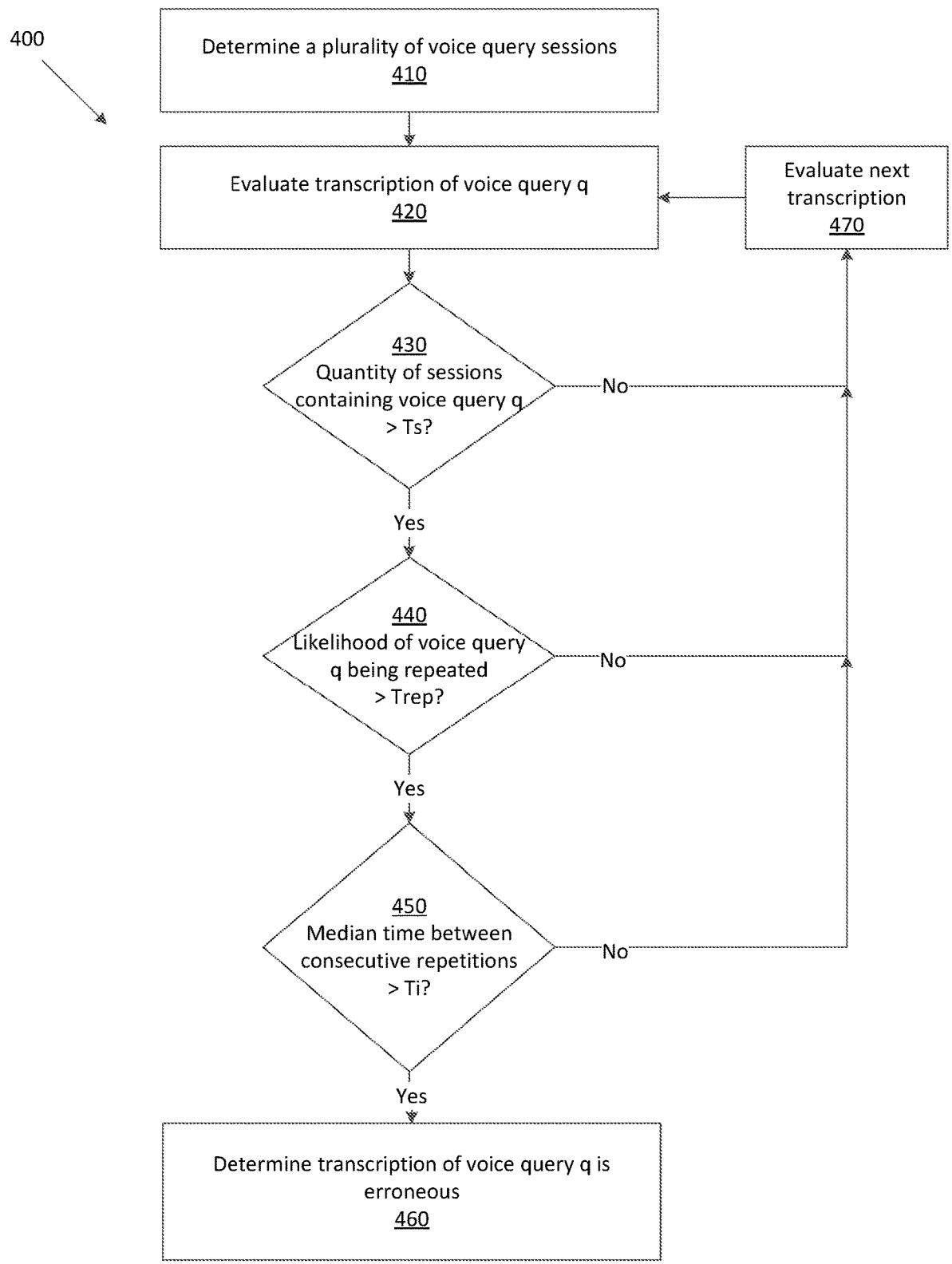
FIG. 4 shows an example method.

FIG. 4 show an example method 400. The example method 400 may be used to determine (e.g., identify) erroneous ASR transcriptions of one or more voice queries of a plurality of voice query sessions. The example method 400 may be used, for example, to implement step 320 of FIG. 3.

In step 410, a plurality of voice query sessions may be determined. Step 410 may be similar to step 310 of FIG. 3. Each voice query session may comprise a plurality of voice queries and, for each of the plurality of voice queries, an automated speech recognition (ASR) transcription of the voice query. Each voice query session may comprise a time-ordered sequence of voice queries received from a same user device (e.g., user device 206 in FIG. 2), where the time between consecutive voice queries of the voice query session satisfies (e.g., does not exceed) a threshold value. For example, a voice query session may comprise a plurality of time-ordered voice queries received from a same device, where the time between consecutive queries does not exceed a threshold of 45 seconds. The 45 second threshold is just one example, and the threshold may be lesser or greater than 45 seconds. For example, the threshold may be 15, 30, or 60 seconds. As mentioned above, one voice query session may comprise a plurality of voice queries received from a user device during a first time period, and another voice query session may comprise another plurality of voice queries received from that same user device during a different time period. Another voice query session may comprise a plurality of voice queries from a different user device. Thus, in the case of a large system having a large number (e.g., potentially millions) of users and user devices, a large number of voice query sessions may be determined.

In step 420, evaluation of an ASR transcription of a voice query, q, of the plurality of voice queries of the plurality of voice query sessions may begin in order to determine whether the ASR transcription of that voice query is erroneous.

At step 430, it may be determined whether a quantity of voice query sessions containing the same ASR transcription of voice query q satisfies (e.g., exceeds) a threshold quantity, $T_s$, of voice query sessions. For example, the threshold quantity may equal 300. The threshold quantity may comprise a different quantity. If the quantity of voice query sessions containing that same ASR voice query transcription does not satisfy the threshold quantity, then the ASR transcription of voice query q will not be determined to be erroneous, and control may pass to step 470 where another ASR transcription of a voice query of the plurality of voice query sessions may be selected. Evaluation of that next ASR transcription may then begin again at step 420.

If, however, the quantity of voice query sessions containing the same ASR transcription of voice query q is determined in step 430 to satisfy (e.g. meet or exceed) the threshold quantity, control may pass to step 440. At step 440, it may be determined whether a probability of the voice query q being repeated by a user satisfies a threshold probability value, $T_{rep}$, having, for example, a value between 0 and 1. For example, $T_{rep}$ may have a value of 0.2. Thus, in this example, the threshold $T_{rep}$ will be satisfied if the probability of the voice query q being repeated exceeds 20%. If this threshold is not satisfied, then the ASR transcription of voice query q will not be determined to be erroneous, and control will pass to step 470 where a next ASR transcription may be selected for evaluation.

If the threshold in step 440 is satisfied, control may pass to step 450. In step 450, it may be determined whether the median amount of time between consecutive repetitions of the voice query q satisfies a threshold amount of time, $T_i$. For example, the threshold amount of time $T_i$ may comprise 13 seconds. The threshold amount of time $T_i$ may comprise a different amount of time, such as 8, 10, or 15 seconds. If the median time between consecutive repetitions of the voice query q does not satisfy (e.g., exceeds) the threshold amount of time $T_i$, then the ASR transcription of voice query q will not be determined to be erroneous, and control will again pass to step 470 for evaluation of a next ASR transcription.

If, however, the median time between consecutive repetitions of the voice query q does satisfy (e.g., does not exceed) the threshold amount of time $T_i$, then the ASR transcription of voice query q may be determined in step 460 to be erroneous.

Figure 5:
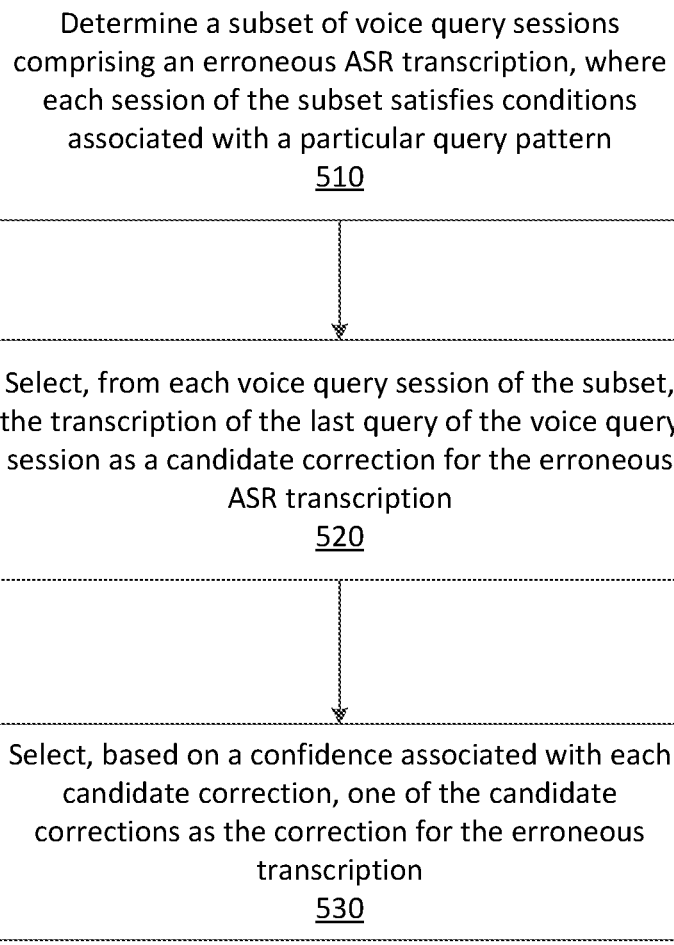
FIG. 5 shows an example method.

FIG. 5 shows another example method 500. The example method 500 may be used to determine automatically a correction for an ASR transcription that is determined to be erroneous, based on an evaluation of query reformulation patterns in one or more of the voice query sessions. The example method 500 may be used, for example, to implement step 330 of FIG. 3.

In step 510, a subset of voice query sessions containing an erroneous ASR transcription of a voice query q (denoted Err(q)) may be determined (i.e., selected), where each session $\{s_1, s_2, \ldots, s_n\}$ of the subset contains $t_i$ time ordered user voice queries (e.g., $s_i = (q_1, q_2, \ldots, q_{ti})$) and meets one or more conditions associated with a particular query reformulation pattern. For example, each voice query session of the subset may be determined to meet the following conditions:

(1) the session contains more than one voice query and does not contain repeated (i.e., duplicated) transcriptions;
(2) the median time interval between voice queries is less than a threshold $T_i$; and
(3) the next-to-last voice query transcription, Err($q_{ti-1}$), is determined to have been erroneous; for example, Err($q_{ti-1}$)=1.

In other examples, the subset of voice query sessions may be selected based on sessions that meet one or more of these conditions. The subset of voice query sessions may be selected based on sessions that meet other conditions indicative of a query reformulation attempt by a user.

In step 520, from each session $s_i$, the transcriptions of the last two voice queries of the session, $q_{ti-1}$ and $q_{ti}$, may be extracted. The transcription of the last voice query $q_{ti}$ may be considered a correction candidate for the erroneous transcription, Err($q_{ti-1}$), of the next-to-last voice query $q_{ti-1}$. The extracted ($q_{ti-1}$, $q_{ti}$) pairs may be grouped by the erroneous transcription, Err($q_{ti-1}$), thereby collecting possible correction candidates among all of the selected sessions.

In step 530, for a specific erroneous transcription of a voice query $q_{ti-1}$, which may now be denoted $q_{err}$, a confidence may be calculated for each associated unique correction candidate, denoted $q'_i$, and a most confident candidate may be selected as a correction. This confidence determination may be expressed as follows:

$$P(q'i | qerr) = \frac{\text{count}(q'i, qerr)}{\text{count}(qerr)}$$

While in a single session, it is possible for the transcription of voice query $q_{ti}$ to be a wrong correction for voice query $q_{ti-1}$, as sessions are aggregated, the best correction candidate often has a much higher confidence than the rest of the correction candidates. Thus, the correction candidate $q'_i$ with a highest determined confidence value P may be determined (i.e., selected) as a correction of the erroneous transcription, Err($q_{ti-1}$).

The erroneous transcription Err($q_{ti-1}$) and its associated voice query data or signal may be annotated with the selected correction candidate $q'_i$. The annotated voice query may be sent to the ASR system performing speech recognition processing on user voice queries (e.g., ASR system 210). The annotated voice query may be used as an additional labeled training sample for a machine learning model utilized by the ASR system. The selected correction of the voice query transcription may be utilized by the ASR system as a synonym for the voice query. Use of the annotated voice query for these purposes may improve the accuracy of speech recognition processing by the ASR system and help to reduce the number of erroneous transcriptions.

In addition to, or alternatively to, the utterance-based methods described above in connection with FIGS. 3-5, a user behavior-based method may be employed for labeling of transcriptions for training of an ASR system, such as the ASR system 210.

Figure 6:
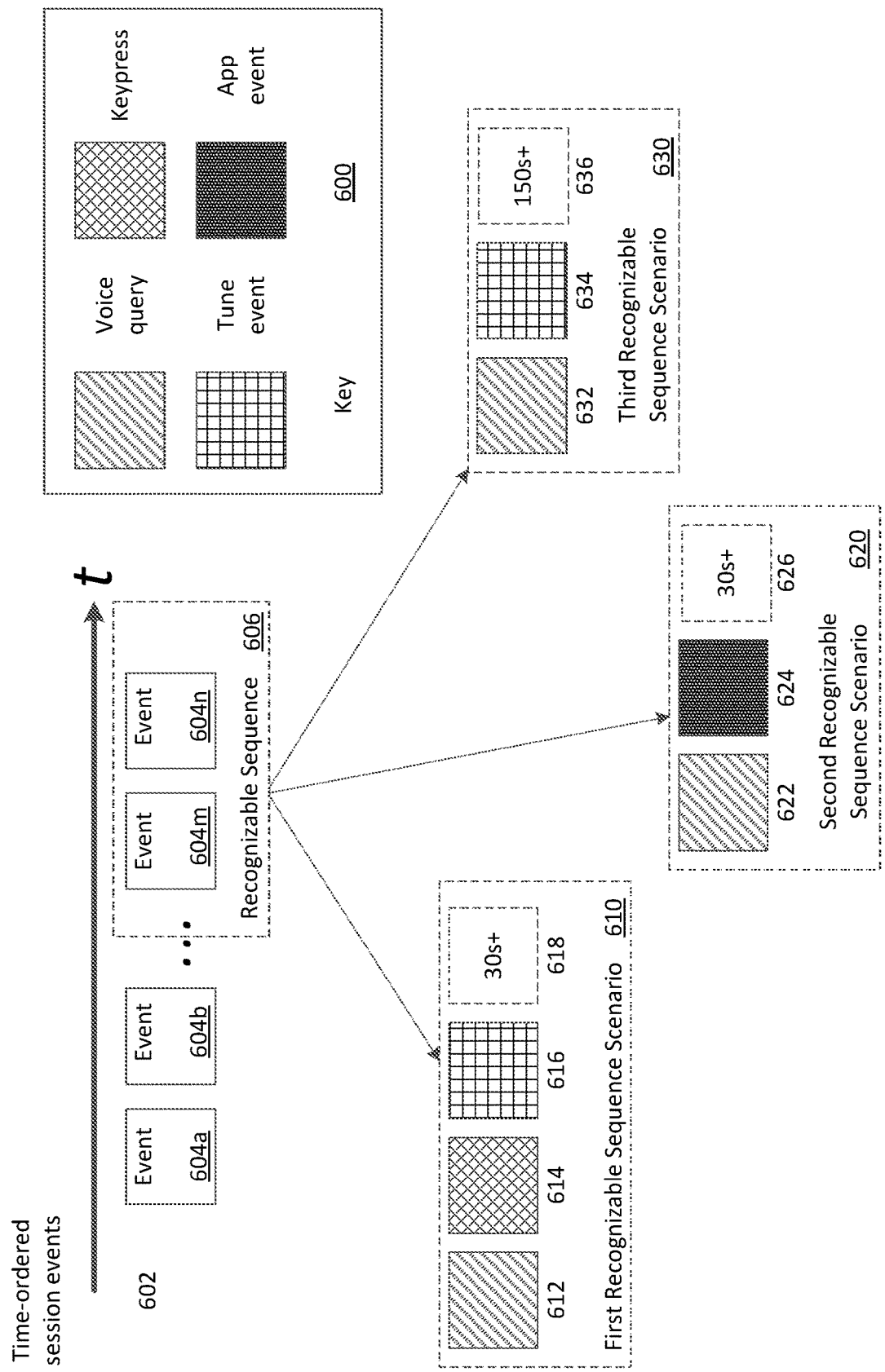
FIG. 6 shows an example method.

FIG. 6 shows an example method of automatically labeling a transcription of a voice query by a machine learning model based on user behavior. For example, a transcription of a voice query may be automatically labeled as having a positive or a negative outcome based on user behavior associated with the voice query.

In FIG. 6, a timeline 602 may comprise example time-ordered session events. The events may be used to automatically generate training data, such as a training label, for a transcription of a voice query. A key 600 shows how various events (i.e., voice queries, keypresses, tune events, and application launch events) are shown in the figure. The ASR system 210 in FIG. 2 may receive voice queries from the user device 206 in FIG. 2 and determine an appropriate transcription of the voice queries. Based on the transcription an operation may be performed, such as tuning to a channel or launching an application.

The ASR system 210 in FIG. 2 may receive an indication of a user event. The user event may be in response to the operation and/or the transcription. For example, the ASR system 210 may receive user keypresses from the user device 206 in FIG. 2. The ASR system 210 may receive an indication of a user tune event. The ASR system 210 may receive an indication of a user's application launch event. Based on the user event, an outcome of the transcription may be determined (e.g., positive/negative, good/bad, etc.). The transcription may be labeled with an indication of the outcome.

In FIG. 6, the timeline 602 shows various time-ordered session events (e.g., event 604a, event 604b, event 604m, event 604n). A session may begin with a voice query. Each subsequent event, such as a voice query or a non-utterance event (i.e., keypress, tune event, and application launch event), may be included in the session if the subsequent event occurs within a threshold time (e.g., 15 seconds, 30 seconds, etc.) of a last event in the session. Based on the event comprising a voice query, the threshold time may comprise 45 seconds, for example. Based on the event comprising a non-utterance event, the threshold time may comprise 30 seconds, for example. A session may be ended if a tuning event or an application launch event occurs within a threshold time (e.g., 15 seconds, 30 seconds, etc.) of a last event in the session. The session may be ended based on no further events occurring within the threshold time. The session may end based on a recognizable sequence 606 occurring. A recognizable sequence 606 may confirm a transcription of a last voice query, such as whether an outcome of the voice query is positive or negative, if the recognizable sequence 606 fits one of a number of recognizable sequence scenarios.

A first example recognizable sequence scenario 610 may comprise a last voice query 612, followed by a keypress 614 (e.g., "enter", "select", etc.), followed by a tune event 616, followed by a period of no events 618 for a certain amount of time (e.g., 30 seconds) or longer. Although the period of no events 618 is shown with a 30 second threshold, any appropriate threshold may be used. The ASR system 210 in FIG. 2 may cause the tune event 616. The ASR system 210 in FIG. 2 may receive an indication of the tune event 616. The ASR system 210 in FIG. 2 may infer that the transcription produced for the last voice query 612 was correct. Based on determining that the transcription was correct, the transcription may be labeled as such or as having a positive outcome. The ASR system 210 in FIG. 2 may infer that any transcriptions produced for voice queries in the session prior to the last voice query 612 were incorrect. Based on determining that the transcriptions were incorrect, the transcriptions may be labeled as such or as having a negative outcome. The automatic labeling of the transcriptions as correct or incorrect or as resulting in a positive or negative outcome may be used as additional training data for the machine learning model in order to improve the ability of the model to translate future voice queries.

The ASR system 210 in FIG. 2 may infer that any transcriptions produced for voice queries in the session prior to the last voice query 612 should have been the transcription produced for the last voice query 612. The ASR system 210 in FIG. 2 may infer that any transcriptions produced for voice queries in the session prior to the last voice query 612 should have been the transcription produced for the last voice query 612 for each prior voice query and/or prior transcription that is sufficiently similar to the last voice query 612 and/or the transcription produced for the last voice query 612.

A second example recognizable sequence scenario 620 may comprise a last voice query 622, followed by an application launch event 624, and a period of no events 626 for 30 seconds or longer. Although the period of no events 626 is shown with a 30 second threshold, any appropriate threshold may be used. The ASR system 210 in FIG. 2 may generate the application launch event 624. The ASR system 210 in FIG. 2 may receive an indication of the application launch event 624. The ASR system 210 in FIG. 2 may infer that the transcription produced (e.g., retrieved, generated, transmitted, etc.) for the last voice query 622 was correct. Based on determining that the transcriptions were correct, the transcriptions may be labeled as having a positive outcome. The ASR system 210 in FIG. 2 may infer that any transcriptions produced for voice queries in the session prior to the last voice query 622 were incorrect. Based on determining that the transcriptions were incorrect, the transcriptions may be labeled as such or as having a negative outcome. The automatic labeling of the transcriptions as correct or incorrect or as resulting in a positive or negative outcome may be used as additional training data for the machine learning model in order to improve the ability of the model to translate future voice queries.

The ASR system 210 in FIG. 2 may infer that any transcriptions produced for voice queries in the session prior to the last voice query 622 should have been the transcription produced for the last voice query 622. The ASR system 210 in FIG. 2 may infer that any transcriptions produced for voice queries in the session prior to the last voice query 622 should have been the transcription produced for the last voice query 622 for each prior voice query and/or prior transcription that is sufficiently similar to the last voice query 622 and/or the transcription produced for the last voice query 622. This information may further be used to train the machine learning model to improve transcriptions.

A third example recognizable sequence scenario 630 may comprise a last voice query 632, followed by a tune event 634, and a period of no events 636 for 150 seconds or longer. Although the period of no events 636 is shown with a 150 second threshold, any appropriate threshold may be used. The ASR system 210 in FIG. 2 may generate the tune event 634. The ASR system 210 in FIG. 2 may receive an indication of the tune event 634. The ASR system 210 in FIG. 2 may infer that the transcription produced (e.g., retrieved, generated, transmitted, etc.) for the last voice query 632 was correct. Based on determining that the transcription was correct, the transcription may be labeled as such or as having a positive outcome. The ASR system 210 in FIG. 2 may infer that any transcriptions produced for voice queries in the session prior to the last voice query 632 were incorrect. Based on determining that the transcriptions were incorrect, these transcriptions may be labeled as such or as having a negative outcome. The ASR system 210 in FIG. 2 may infer that any transcriptions produced for voice queries in the session prior to the last voice query 632 should have been the transcription produced for the last voice query 632. The ASR system 210 in FIG. 2 may infer that any transcriptions produced for voice queries in the session prior to the last voice query 632 should have been the transcription produced for the last voice query 632 for each prior voice query and/or prior transcription that is sufficiently similar to the last voice query 632 and/or the transcription produced for the last voice query 632. The automatic labeling of the transcriptions as correct or incorrect or as resulting in a positive or negative outcome may be used as additional training data for the machine learning model in order to improve the ability of the model to translate future voice queries.

Figure 7:
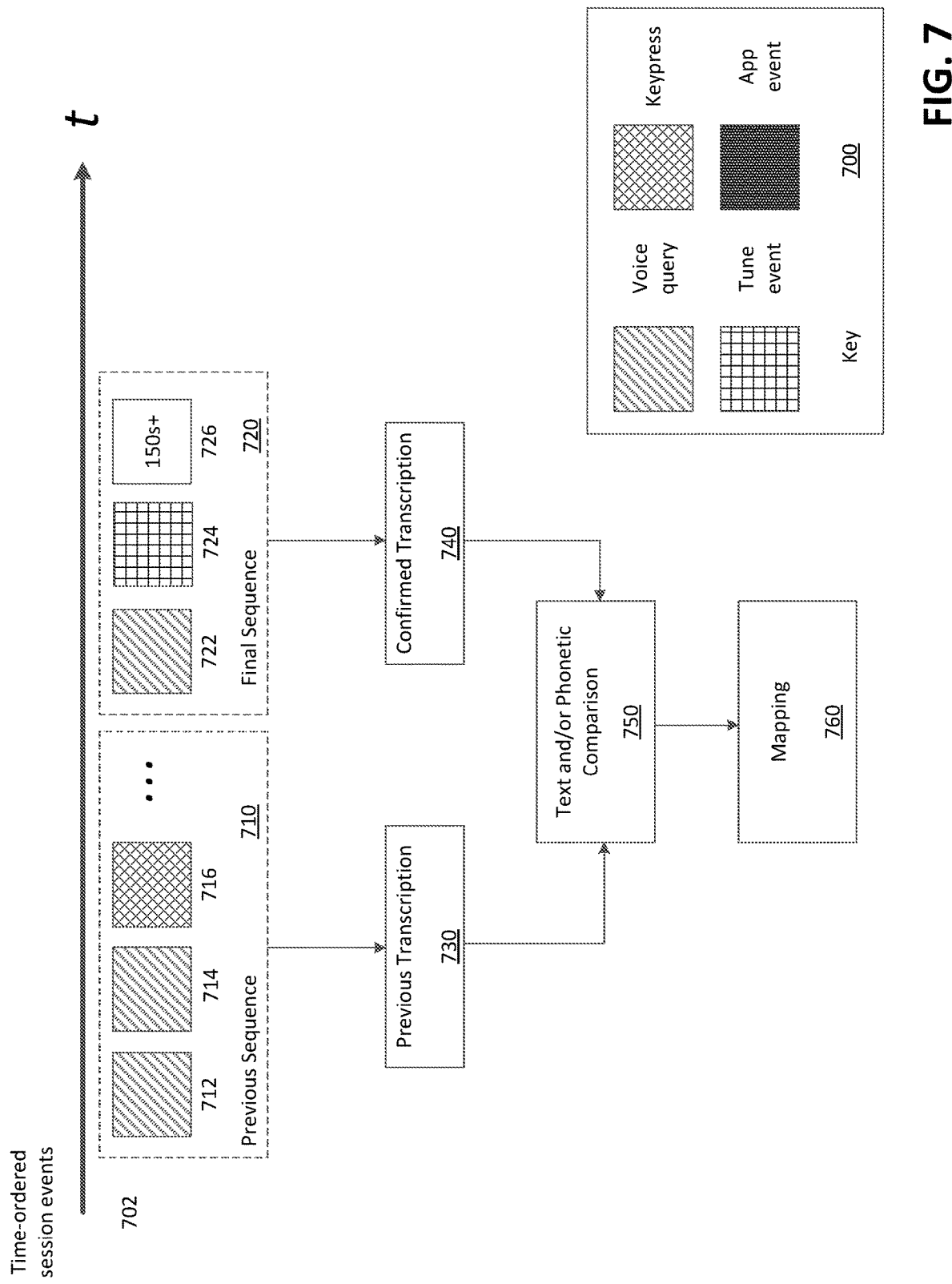
FIG. 7 shows an example method.

FIG. 7 shows another method for improved transcription of voice queries by a machine learning model. As shown, a timeline 702 may comprise example time-ordered session events. The events may be used to generate training data of a machine learning model. A key 700 shows how various events (i.e., voice queries, keypresses, tune events, and application launch events) are shown in the figure. The ASR system 210 in FIG. 2 may receive voice queries from the user device 206 in FIG. 2 and determine appropriate transcriptions (i.e., transcriptions).

The ASR system 210 in FIG. 2 may receive indications of user events. For example, the ASR system 210 may receive user keypresses from the user device 206 in FIG. 2. The ASR system 210 in FIG. 2 may receive an indication of a user tune event. The ASR system 210 in FIG. 2 may receive an indication of a user's application launch event. Based on the user event, an outcome of the transcription may be determined (e.g., positive/negative, good/bad, etc.). The transcription may be labeled with an indication of the outcome.

The timeline 702 shows various time-ordered session events. A session may begin with a voice query. Each subsequent voice query or non-utterance event (i.e., keypress, tune event, and application launch event) may be included in the session if the subsequent event occurs within a threshold time (e.g., 15 seconds, 30 seconds, etc.) of a last event in the session. A session may be ended if a tuning event or an application launch event occurs within a threshold time (e.g., 15 seconds, 30 seconds, etc.) of a last event in the session. The session may end based on a recognizable sequence, as discussed in FIG. 6, occurring.

The various time-ordered session events comprise a previous sequence of events 710 and a final sequence of events 720. The previous sequence of events 710 may comprise a first voice query 712, a second voice query 714, a keypress 716, etc. The previous sequence of events 710 may comprise an error, such as an error in responding to one of the events 712, 714, 716. The final sequence 720 may comprise one of the three scenarios described in FIG. 6. The final sequence 720 may comprise a last voice query 722, a tune event 724, and a period of no events 726 for 150 seconds or longer. The final sequence 720 may comprise one or more events 712, 714, 716 from the previous sequence 710. The final sequence 720 may be similar to any of the scenarios 610, 620, or 630 in FIG. 6.

The second to last utterance (second voice query 714) may be extracted from the session events and a previous transcription 730 associated with the second to last utterance may be determined. The last utterance (voice query 722) may be extracted from the session events and a transcription 740 may be determined. The ASR system 210 in FIG. 2 may determine that no confirmation events (e.g., "Enter" key pressed, "Play" key pressed, "Select" key pressed, etc.) occurred between the time of the previous transcription 730 and the transcription 740.

The ASR system 210 in FIG. 2 may perform (e.g., execute, implement, etc.) a text and/or phonetic comparison 750 on the previous transcription 730 and the transcription 740 and/or on the second to last utterance and the last utterance. A text similarity number between 0 and 1 may be generated, indicating text similarity between the compared transcriptions and/or utterances. A phonetic similarity number between 0 and 1 may be generated, indicating phonetic similarity between the compared transcriptions and/or utterances. If the text similarity is within a first range and/or the phonetic similarity is within a second range, the previous transcription 730 may be considered suspicious. The first range may be the same as the second range. The first range may be different from the second range. The first range may include 0 at the lower bound. The first range may include 1 at the upper bound. The second range include 0 at the lower bound. The second range may include 1 at the upper bound. The first range and the second range may comprise an overlap with each other. For example, if a voice query comprises the title "E.T.," a transcription that is "BET" may have a text similarity of 0.067 and a phonetic similarity of 0.83. If the ASR system 210 in FIG. 2 determines that the previous transcription 730 is suspicious, the ASR system 210 in FIG. 2 may generate a mapping 760 from the previous transcription 730 to the transcription 740. Based on the ASR system 210 in FIG. 2 selecting the previous transcription 730 in the future, the mapping 760 may cause the ASR system 210 in FIG. 2 to return the transcription 740. The mapping 760 may therefore be used to improve future transcriptions of the voice queries.

The ASR system 210 in FIG. 2 may start the process over with the extracted last utterance and extract another previous utterance (first voice query 712) to determine if a transcription associated with the another previous utterance should be mapped to the transcription 740. The process may be repeated for every voice query in the session.

Figure 8:
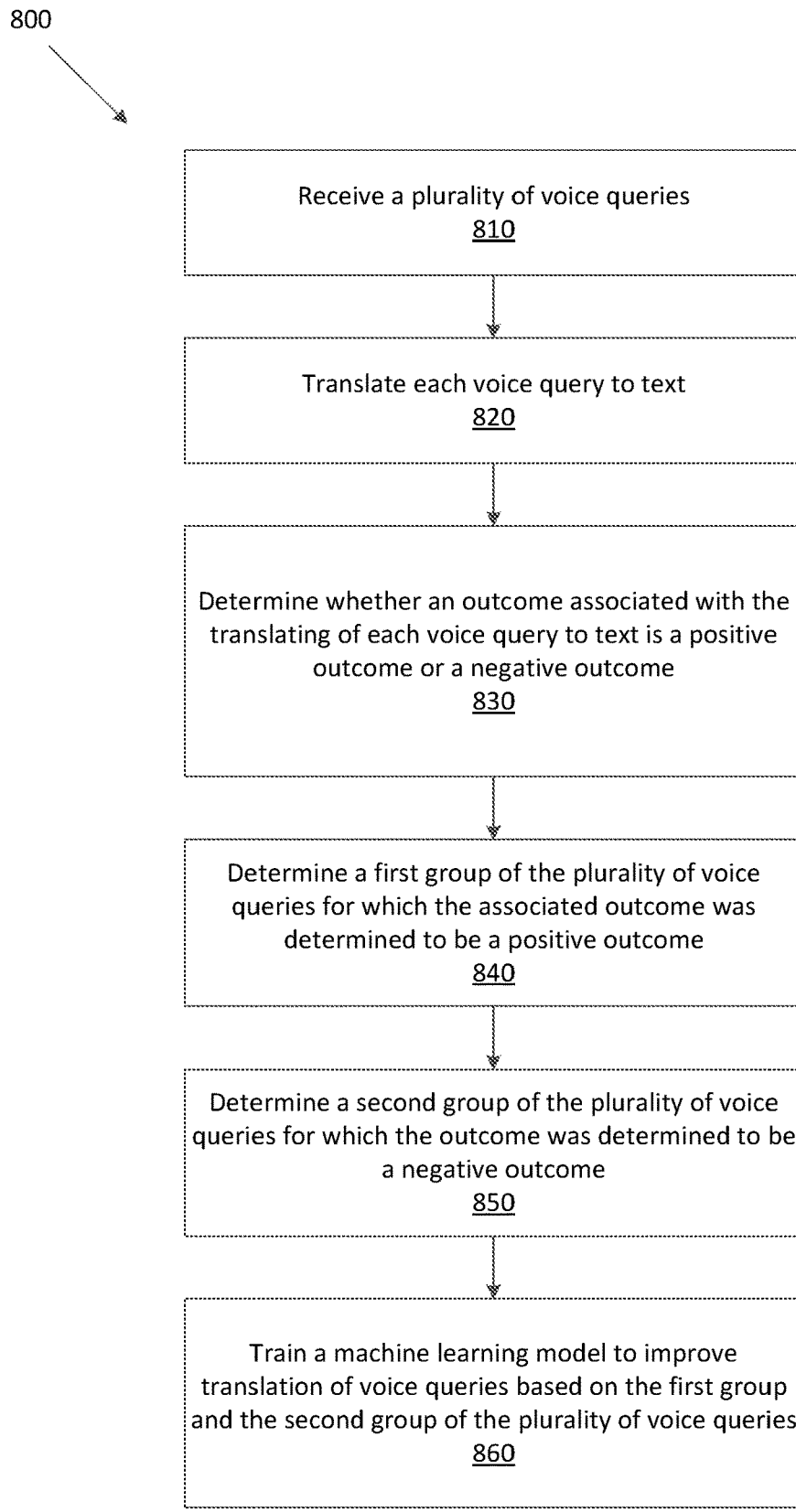
FIG. 8 shows an example method.

FIG. 8 shows an example method 800. At step 810, a plurality of voice queries may be received. The ASR system 210 in FIG. 2 may receive the plurality of voice queries. Each of the voice queries may comprise at least a same first utterance. The voice queries may be associated with at least one of a particular user, a particular premises, or a particular group of users. The plurality of voice queries may be received via at least one of a remote control, a television, or a mobile device.

At step 820, each voice query may be translated, i.e., transcribed, to text. The ASR system 210 in FIG. 2 may translate each voice query to text. At step 830, a determination may be made, for each voice query and based on user behavior associated with the voice query, whether an outcome associated with the translating of the voice query to text is a positive outcome or a negative outcome. The ASR system 210 in FIG. 2 may determine whether an outcome associated with the translating of the voice query to text is a positive outcome or a negative outcome. The determining whether the outcome is a positive outcome or a negative outcome may be based on an operation executed based on the transcription, such as tuning to a channel or launching an application. The determining whether the outcome is a positive outcome or a negative outcome may comprise determining that a follow-up query was not issued or determining that a device stayed tuned to a channel. The determining whether the outcome is a positive outcome or a negative outcome may be associated with a channel tuned to or a tune-in duration. The determination whether an outcome associated with the translating of the voice query to text is a positive outcome or a negative outcome may be performed using any of the methods or techniques illustrated and described in connection with FIGS. 6 and 7.

At step 840, a first group of the plurality of voice queries may be determined for which the associated outcome was determined to be a positive outcome. The ASR system 210 in FIG. 2 may determine the first group of the plurality of voice queries for which the associated outcome was determined to be a positive outcome.

At step 850, a second group of the plurality of voice queries may be determined for which the outcome was determined to be a negative outcome. The ASR system 210 in FIG. 2 may determine the second group of the plurality of voice queries for which the outcome was determined to be a negative outcome.

At step 860, a machine learning model of an ASR system, such as the ASR system 210 of FIG. 2, may be trained to improve transcription of voice queries based on the first group and the second group of the plurality of voice queries. The ASR system 210 in FIG. 2 may train a machine learning model to improve transcription of voice queries based on the first group and the second group of the plurality of voice queries. The training the machine learning model to improve transcription of voice queries based on the first group and the second group of the plurality of voice queries may comprise training the machine learning model to determine an improved transcription of at least a portion of each of the second group of voice queries. The training the machine learning model to improve transcription of voice queries may comprise training the machine learning model to improve transcription of voice queries associated with at least one of a particular user, a particular premises, or a particular group of users.

The trained machine learning model may be tested. The ASR system 210 in FIG. 2 may test the trained machine learning model. Another voice query may be fed to the trained machine learning model to determine a transcription of the another voice query. The ASR system 210 in FIG. 2 may feed another voice query to the trained machine learning model to determine a transcription of the another voice query.

A transcription of another voice query may be determined using the trained machine learning model. The ASR system 210 in FIG. 2 may determine a transcription of another voice query using the trained machine learning model. Based on the transcription, the ASR system 210 may cause at least one of a program to be launched, a device to tune to a channel, or content to be selected.

A determination may be made of whether an outcome associated with the translating of the voice query to text is a positive outcome or a negative outcome based on at least one of a follow-up query being issued, a follow-up query not being issued, or a duration of a device staying tuned to a channel. A determination may be made of whether an outcome associated with the translating of the voice query to text is a positive outcome or a negative outcome based on an operation executed based on the text transcription and a user response to the operation. The determination whether an outcome associated with the translating of the voice query to text is a positive outcome or a negative outcome may be performed using any of the methods or techniques illustrated and described in connection with FIGS. 6 and 7. The voice query may be indicative of at least one of a content asset or a content channel.

Another voice query may be fed to the trained machine learning model. An operation may be caused to execute based on a transcription of the another voice query determined by the trained machine learning model. The operation may comprise at least one of causing a program to launch or causing a device to tune to a channel.

Figure 9:
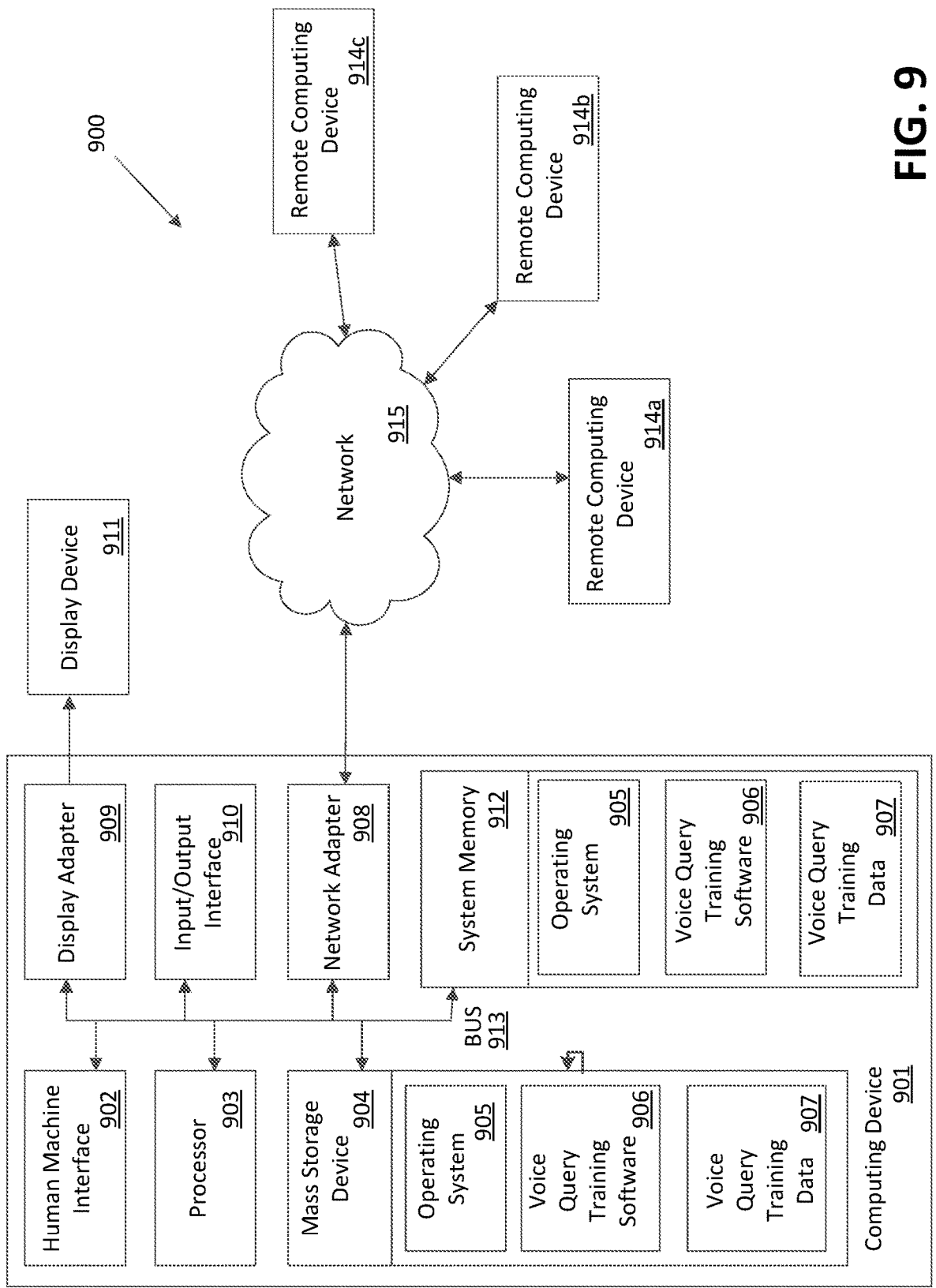
FIG. 9 shows an example computing environment.

FIG. 9 shows an example computing environment. The systems, methods, and apparatuses described herein may be implemented on a computing device such as a computing device 901 (e.g., computer) as shown in FIG. 9 and described below. An automatic speech recognition (ASR) system, such as the ASR system 210 in FIG. 2, or any component of an ASR system may comprise one or more computing devices as shown in FIG. 9. Similarly, the methods, systems, and apparatuses disclosed may utilize one or more computing device to perform one or more functions in one or more locations. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 901. The components of the computing device 901 may comprise, but are not limited to, one or more processors 903, a system memory 912, and a system bus 913 that couples various system components including the processor 903 to the system memory 912. With multiple processors 903, the system may utilize parallel computing.

The system bus 913 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description may be implemented over a wired or wireless network connection and each of the subsystems, including the processor 903, a mass storage device 904, an operating system 905, voice query training software 906, voice query training data 907, a network adapter 908, system memory 912, an Input/Output Interface 910, a display adapter 909, a display device 911, and a human machine interface 902, may be contained within one or more remote computing devices 914a,b,c at physically separate locations, connected through buses of this form, in effect implementing a fully distributed system.

The computing device 901 may comprise a variety of computer readable media. Readable media may be any available media that is accessible by the computing device 901 and may comprise both volatile and non-volatile media, removable and non-removable media. The system memory 912 may comprise computer readable media in the form of volatile memory, such as random access memory (RAM), and/or non-volatile memory, such as read only memory (ROM). The system memory 912 typically contains data such as voice query training data 907 and/or program modules such as operating system 905 and voice query training software 906 that are immediately accessible to and/or are presently operated on by the processor 903.

The computing device 901 may comprise other removable/non-removable, volatile/non-volatile computer storage media. FIG. 9 shows a mass storage device 904 which may provide non-volatile storage of computer code, computer readable instructions, data structures, program modules, and other data for the computing device 901. A mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 904, including an operating system 905 and voice query training software 906. Each of the operating system 905 and voice query training software 906 (or some combination thereof) may comprise elements of the programming and the voice query training software 906. Voice query training data 907 may be stored on the mass storage device 904. Voice query training data 907 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter queries and information into the computing device 901 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 903 via a human machine interface 902 that is coupled to the system bus 913, but may be connected by other interface and bus structures, such as a parallel port, game port, an IEEE 1394 Port (also known as a Firewire port), a serial port, or a universal serial bus (USB).

A display device 911 may be connected to the system bus 913 via an interface, such as a display adapter 909. It is contemplated that the computing device 901 may have more than one display adapter 909 and the computing device 901 may have more than one display device 911. A display device may be a monitor, an LCD (Liquid Crystal Display), or a projector. Output peripheral devices may comprise components such as speakers (not shown) and a printer (not shown) which may be connected to the computing device 901 via Input/Output Interface 910. Any step and/or result of the methods may be output in any form to an output device. Such output may be any form of visual representation, including, but not limited to, textual, graphical, animation, audio, tactile, and the like. The display 911 and computing device 901 may be part of one device, or separate devices.

The computing device 901 may operate in a networked environment using logical connections to one or more remote computing devices 914a,b,c. A remote computing device may be a personal computer, portable computer, smartphone, a server, a router, a network computer, a peer device or other common network node, and so on. Logical connections between the computing device 901 and a remote computing device 914a,b,c may be made via a network 915, such as a local area network (LAN) and a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components reside at various times in different storage components of the computing device 901, and are executed by the data processor(s) of the computer. An implementation of voice query training software 906 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise non-transitory, volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which may be used to store the desired information and which may be accessed by a computer.

What is claimed:

1. A method comprising:
   determining, by an automatic speech recognition (ASR) system executing on a computing device, a plurality of voice query sessions, wherein each voice query session comprises a plurality of voice queries and an ASR transcription for each of the plurality of voice queries;
   determining, by the ASR system and based on one or more characteristics of user behavior responsive to an ASR transcription of a voice query of the plurality of voice queries of the plurality of voice query sessions, that the ASR transcription of the voice query is erroneous;
   determining, by the ASR system and based on a query pattern associated with a plurality of voice query sessions comprising the voice query, a correction of the ASR transcription of the erroneous transcription; and
   updating, by providing the correction of the ASR transcription as a training input to a machine learning model associated with the ASR system, the ASR system.

2. The method recited in claim 1, wherein the one or more characteristics of user behavior responsive to the voice query comprises at least one of:
   a quantity of voice query sessions containing the voice query;
   a value indicative of a probability of the voice query being repeated; and
   a median amount of time between consecutive repetitions of the voice query.

3. The method recited in claim 1, wherein the determining, based on the one or more characteristics of user behavior responsive to the voice query, that the ASR transcription of the voice query is erroneous comprises determining that each of the one or more characteristics satisfies a respective threshold value.

4. The method recited in claim 1, wherein each voice query session of the plurality of voice query sessions comprises a time-ordered plurality of voice queries received from a same user device, and wherein an amount of time between consecutive queries does not exceed a threshold amount of time.

5. The method recited in claim 1, further comprising:
annotating the erroneous transcription with the determined correction; and
providing the annotated erroneous transcription as a training input to the machine learning model.

6. The method recited in claim 1, wherein the query pattern comprises a query reformulation pattern.

7. The method recited in claim 1, wherein the determining the correction of the erroneous transcription comprises:
determining a subset of the plurality of voice query sessions comprising the voice query, wherein each voice query session of the determined subset satisfies one or more conditions associated with the query pattern;
selecting, from each voice query session of the determined subset, the transcription of a last query of the voice query session as a candidate correction for the erroneous transcription; and
selecting, based on a confidence associated with each candidate correction, one of the candidate corrections as the correction of the erroneous transcription.

8. The method recited in claim 7, wherein the one or more conditions that each voice query session of the subset satisfies comprises:
a condition that the voice query session contains more than one voice query and does not contain repeated transcriptions;
a condition that a median time interval between voice queries of the voice query session does not exceed a threshold amount of time; and
a condition that the erroneous transcription is the transcription of a next-to-last voice query of the session.

9. The method recited in claim 1, wherein the determining the correction of the erroneous transcription comprises:
determining a subset of the plurality of voice query sessions comprising the voice query;
selecting, from each voice query session of the determined subset, a transcription of another voice query in the voice query session that is subsequent to the voice query, wherein the selected transcription is a candidate correction for the erroneous transcription; and
selecting, based on a confidence associated with each candidate correction, one of the candidate corrections as the correction of the erroneous transcription.

10. The method recited in claim 9, wherein the determining the subset of the plurality of voice query sessions comprising the voice query comprises determining the subset of the plurality of voice query sessions that each satisfies the following conditions:
the voice query session contains more than one voice query and does not contain repeated transcriptions;
a median time interval between voice queries of the voice query session does not exceed a threshold amount of time; and
the erroneous transcription is the transcription of a next-to-last voice query of the session.

11. A method comprising:
receiving a plurality of voice queries, wherein each one of the plurality of voice queries is associated with an utterance;
translating each voice query to text;
determining, for each voice query and based on user behavior responsive to the textual translation of the voice query, whether an outcome associated with the translating of the voice query to text is a positive outcome or a negative outcome;
determining, based on the user behavior responsive to the textual translation of the voice query associated with the utterance, a first group of the plurality of voice queries for which the associated outcome was determined to be a positive outcome;
determining, based on the user behavior responsive to the textual translation of the voice query associated with the utterance, a second group of the plurality of voice queries for which the outcome was determined to be a negative outcome; and
training, based on the first group and the second group of the plurality of voice queries of the utterance, a machine learning model to improve transcription of voice queries.

12. The method recited in claim 11, wherein the training, based on the first group and the second group of the plurality of voice queries, the machine learning model to improve transcription of voice queries comprises training the machine learning model to determine an improved transcription of at least a portion of each of the second group of voice queries.

13. The method recited in claim 11, wherein the determining whether the outcome is a positive outcome or a negative outcome comprises determining that a follow-up query was not issued or determining that a device stayed tuned to a channel.

14. The method recited in claim 11, wherein the determining whether the outcome is a positive outcome or a negative outcome is associated with a channel tuned to or a tune-in duration.

15. The method recited in claim 11, wherein the voice queries are associated with at least one of a particular user, a particular premises, or a particular group of users.

16. The method recited in claim 11, wherein the training the machine learning model to improve transcription of voice queries comprises training the machine learning model to improve transcription of voice queries associated with at least one of a particular user, a particular premises, or a particular group of users.

17. The method recited in claim 11, wherein the plurality of voice queries are received via at least one of a remote control, a television, or a mobile device.

18. The method recited in claim 11, wherein each of the received voice queries comprises at least a same first utterance.

19. The method recited in claim 11, further comprising applying the trained machine learning model to another voice query to determine a transcription of the another voice query.

* * * * *